(12) United States Patent
Han et al.

(10) Patent No.: US 12,038,320 B2
(45) Date of Patent: Jul. 16, 2024

(54) DISTRIBUTED INTELLIGENT SNAP INFORMATICS

(71) Applicant: NEC Laboratories America, Inc., Princeton, NJ (US)

(72) Inventors: Shaobo Han, Princeton, NJ (US); Yuheng Chen, South Brunswick, NJ (US); Ming-Fang Huang, Princeton, NJ (US); Tingfeng Li, Plainsboro, NJ (US)

(73) Assignee: NEC Corporation, Tokyo (JP)

( * ) Notice: Subject to any disclaimer, the term of this patent is extended or adjusted under 35 U.S.C. 154(b) by 227 days.

(21) Appl. No.: 17/556,928

(22) Filed: Dec. 20, 2021

(65) Prior Publication Data

US 2022/0196463 A1 Jun. 23, 2022

Related U.S. Application Data

(60) Provisional application No. 63/141,223, filed on Jan. 25, 2021, provisional application No. 63/128,973, filed on Dec. 22, 2020.

(51) Int. Cl.
*G01H 9/00* (2006.01)
*B60W 30/18* (2012.01)
*G06V 10/14* (2022.01)
*G06V 10/82* (2022.01)
*G06V 20/52* (2022.01)
*H04B 10/2537* (2013.01)

(52) U.S. Cl.
CPC ............ *G01H 9/004* (2013.01); *B60W 30/18* (2013.01); *G06V 10/14* (2022.01); *G06V 10/82* (2022.01); *G06V 20/52* (2022.01); *H04B 10/2537* (2013.01); *B60W 2420/406* (2013.01); *G06V 2201/08* (2022.01)

(58) Field of Classification Search
CPC .......... G01H 9/004; B60W 30/18; B60W 2420/406; G06V 10/14; G06V 10/82; G06V 20/52; G06V 2201/08; G06V 20/44; G06V 10/764; H04B 10/2537
See application file for complete search history.

(56) References Cited

U.S. PATENT DOCUMENTS

| | | | | |
|---|---|---|---|---|
| 2016/0078760 | A1* | 3/2016 | Crickmore | ........... G08G 1/0116 |
| | | | | 701/117 |
| 2021/0134088 | A1* | 5/2021 | Dingli | ................. G07C 5/0808 |
| 2022/0196463 | A1* | 6/2022 | Han | ................... H04B 10/2537 |
| 2023/0194115 | A1* | 6/2023 | Malik | ..................... F24F 11/63 |
| | | | | 700/276 |

FOREIGN PATENT DOCUMENTS

| | | | | | |
|---|---|---|---|---|---|
| WO | WO-2020116030 | A1 * | 6/2020 | ............ | B60W 50/14 |
| WO | WO-2022140486 | A1 * | 6/2022 | ............ | B60W 30/18 |

\* cited by examiner

*Primary Examiner* — Daniel Pihulic
(74) *Attorney, Agent, or Firm* — Joseph Kolodka (57) ABSTRACT

A fiber optic sensing technology for vehicle run-off-road incident automatic detection by an indicator of sonic alert pattern (SNAP) vibration patterns. A machine learning method is employed and trained and evaluated against a variety of heterogeneous factors using controlled experiments, demonstrating applicability for future field deployment. Extracted events resulting from operation of our system may be advantageously incorporated into existing management systems for intelligent transportation and smart city applications, facilitating real-time alleviation of traffic congestion and/or providing a quick response rescue and clearance operation.

7 Claims, 8 Drawing Sheets

DISTRIBUTED INTELLIGENT SNAP INFORMATICS

CROSS REFERENCE TO RELATED APPLICATIONS

This application claims the benefit of U.S. Provisional Patent Application Ser. No. 63/128,973 filed 22 Dec. 2020 and U.S. Provisional Patent Application Ser. No. 63/141,223 filed 25 Jan. 2021 the entire contents of each of which is incorporated by reference as if set forth at length herein.

TECHNICAL FIELD

This disclosure relates generally to distributed fiber optic sensing (DFOS) of highways/roadways. More particularly, it pertains to a method for determining real time highway conditions and activity from vibrational events resulting from vehicular/sonic alert pattern (SNAP) interactions.

BACKGROUND

As will be understood by those skilled in the art, one highway development that has enhanced highway/road safety is the shoulder rumble strip—also known in the art as Sonic Alert Patterns (SNAP)—which produce mechanical vibrations and accompanying warning sounds to notify drowsy or distracted drivers when their vehicle travel over the patterns (SNAP events). Despite the utility of notifying a driver (or passenger) of such activity, highway planners and emergency personnel may also benefit from notification of SNAP events—particularly in real time when such events occur.

SUMMARY

An advance in the art is made according to aspects of the present disclosure directed to systems, methods, and structures that detect and report sonic alert pattern (SNAP) events in real time such that real time response may result.

In sharp contrast to the prior art, systems, methods, and structures according to aspects of the present disclosure employ a fiber optic sensing technology for vehicle run-off-road incident automatic detection by an indicator of sonic alert pattern (SNAP) vibration patterns. A machine learning method is employed and trained and evaluated against a variety of heterogeneous factors using controlled experiments. Extracted events resulting from operation of our system may be advantageously incorporated into existing management systems for intelligent transportation and smart city applications, facilitating real-time alleviation of traffic congestion and/or providing a quick response rescue and clearance operation(s).

BRIEF DESCRIPTION OF THE DRAWING

A more complete understanding of the present disclosure may be realized by reference to the accompanying drawing in which.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background—we again note that in recent years, distributed fiber optic sensing (DFOS) systems including distributed vibration sensing (DVS) and distributed acoustic sensing (DAS) have found widespread acceptance in numerous applications including—but not limited to—infrastructure monitoring, intrusion detection, and earthquake detection. For DAS and DVS, backward Rayleigh scattering effects are used to detect changes in the fiber strain, while the fiber itself acts as the transmission medium for conveying the optical sensing signal back to an interrogator for subsequent analysis.

Figure 1:
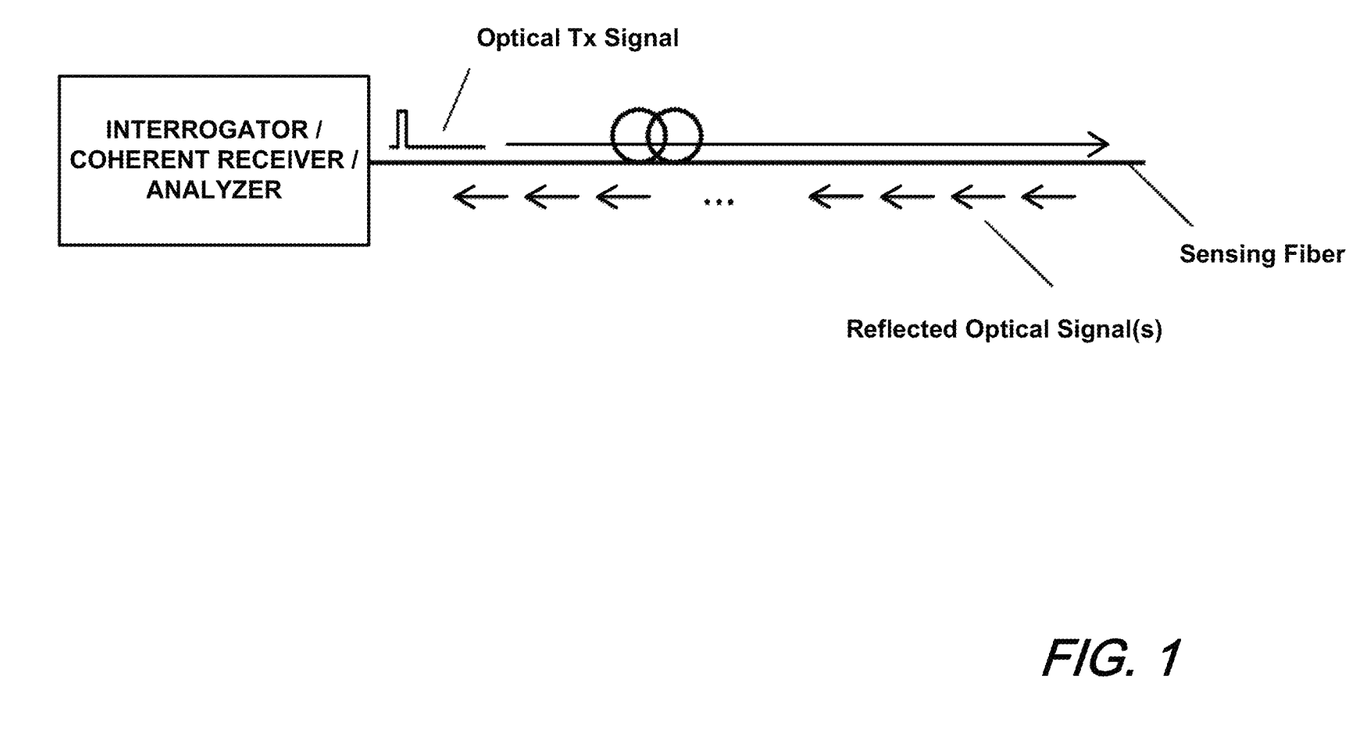
FIG. 1 is a schematic diagram of an illustrative distributed fiber optic sensing system (DFOS) generally known in the art.

By way of some additional background—and with reference to FIG. 1 which is a schematic diagram of an illustrative distributed fiber optic sensing system generally known in the art—we begin by noting that distributed fiber optic sensing (DFOS) is an important and widely used technology to detect environmental conditions (such as temperature, vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

We note that one guiding principle of systems, methods, and structures according to aspects of the present disclosure is using existing fiber infrastructure as sensing media—along with our associated Distributed Intelligent SNAP Informatics (DISI) system—to detect highway/roadway incident events such that the road incident events can be detected/determined and subsequently prevented by distributed optical sensing (DFOS) and AI technologies. As those skilled in the art will understand and appreciate, since SNAPs are oftentimes installed between traffic lanes of a highway/roadway, systems, methods, and structures according to aspects of the present disclosure enable the discovery and reporting of highway incidents vehicles crossing SNAPs and stopping on the shoulder of the highway.

Advantageously, our illustrative systems, methods, and structures according to aspects of the present disclosure advantageously utilize an in-place infrastructure of optical fiber cables to detect/determine valuable highway transportation related data. When a DISI system is combined with DFOS it advantageously may include both Distributed Acoustic Sensing (DAS) and Distributed Vibration Sensing (DVS) coupled with machine learning technologies thereby providing accident or other event coverage to tens of kilometers of roadway/highway by one integrated system.

As we shall describe further, DISI is an AI-based traffic analysis and management unit that reports drift-off-road traffic incidents and emergency stop events in real time and/or near-real-time. Collected data can be incorporated into Geographic Information Systems (GIS) for highway/roadway infrastructure service/management/maintenance operation, and other decision-making purposes. Our distributed fiber optic sensing-based approach has the advantages of being non-destructive while exhibiting relatively low deployment cost, high spatial-resolution and low latency characteristics.

As those skilled in the art will understand and appreciate, a key technical challenge with the systems, structures, and methods disclosed herein is the identification of distinct data patterns associated with events resulting from vehicles crossing rumble stripes, as conveyed by spatio-temporal data streams from a DFOS (DAS) system.

In a typical deployment/operation, SNAP crossing signals are buried or otherwise obfuscated by background noises caused by normal traffic and environmental noise. Although rumble strips produce audible rumbling in audio frequencies, the range of the frequency changes with the spacing of grooves and the driving speed of the vehicles. Furthermore, the vehicle type, weather condition, sensing distance, and soil type can all make the patterns different in the received sensor data. In addition, the change of speed before and after crossing the rumble stripes also contains useful information for SNAP event detection.

As we shall show and describe further, to address these challenges, we employ a deep learning-based approach on the DAS data. The deep learning system and method software learns what constitute such distinctive patterns by comparing normal traffic signals against those with SNAP events. To facilitate such learning, we create a local spatial-temporal window, such that more focus is directed to features that makes SNAP events look different among other high intensity events. Comparing to traditional frequency-based approach, the local spatial-temporal window can also exploit the context information before and after SNAP vibrations.

More specifically, our model includes at least two main components—an embedding network for representation learning and a Support Vector Machine (SVM) for classification. As currently implemented, the embedding network is a Convolutional Neural Network (CNN) with three convolutional layers and three fully connected layers. We also add drop out and rectified linear unit (ReLU) after each fully connected layer for non-linearity and overfitting alleviation. The embedding network is trained with a triplet loss to enlarge distance between SNAP patches and other irrelevant patches, while shortening the distance between different SNAP patches in representation space. Based on the learned representation, we can train a more accurate SVM classifier to distinguish SNAP events from other events.

Figure 2A:
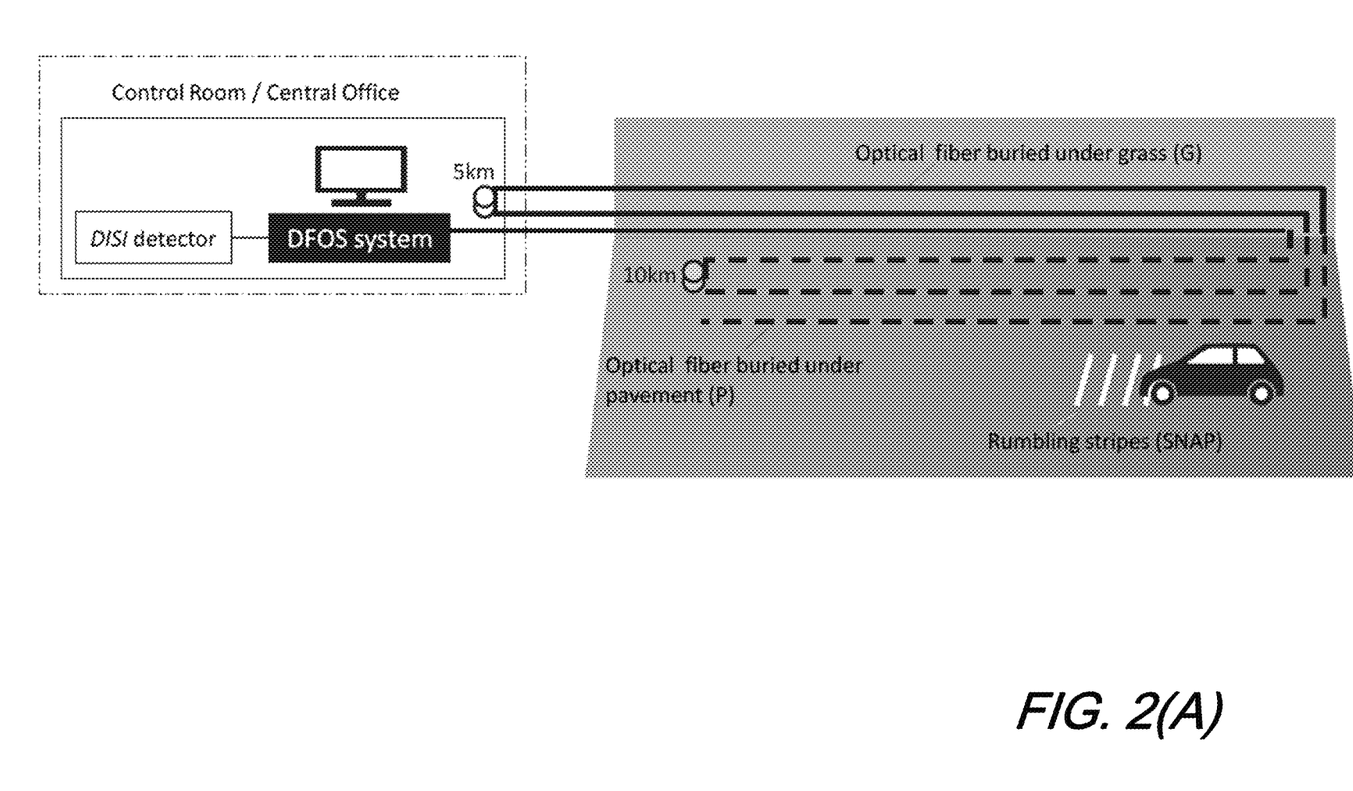
FIG. 2(A) and FIG. 2(B) show illustrative system layout of a sensing layer overlaid on a deployed optical sensing fiber and collected SNAP signals displayed as schematic waterfall images for both a sunny and rainy day according to aspects of the present disclosure.
Figure 2B:
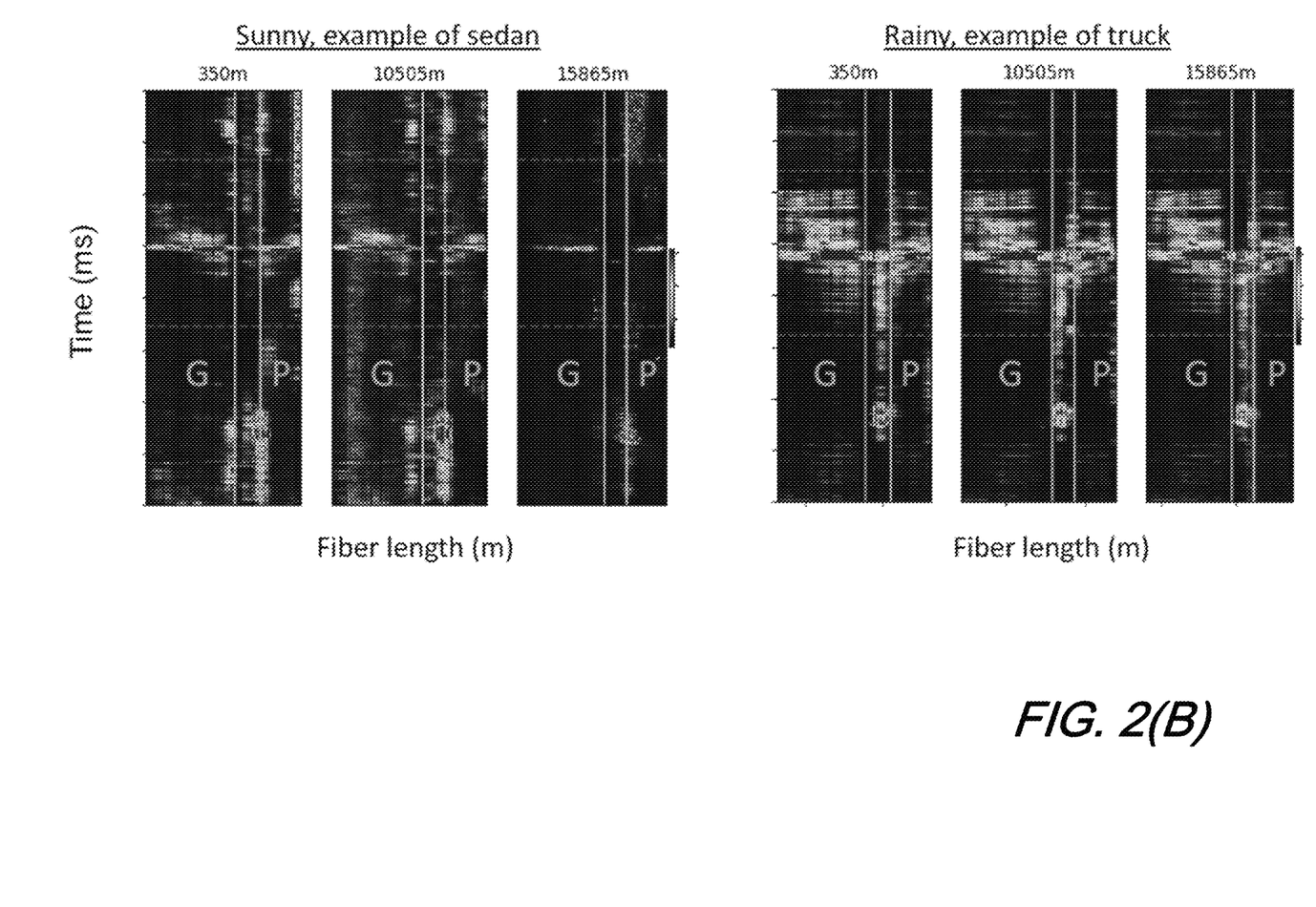

FIG. 2(A) and FIG. 2(B) show illustrative system layout of a sensing layer overlaid on a deployed optical sensing fiber and collected SNAP signals displayed as schematic waterfall images for both a sunny and rainy day according to aspects of the present disclosure.

With simultaneous reference to these figures, FIG. 2(A) shows the illustrative configuration having a sensing layer overlaid on deployed fiber. The optical sensing system (DFOS) and Distributed Intelligent SNAP Informatics (DISI) detector is shown located in a control office/central office for remote monitoring of entire fiber optic sensor cable route. The DFOS system is connected to the field optical fiber to provide sensing functions.

As shown illustratively in the figure, there are two sections of buried fiber, under grass and another under asphalt pavement. To increase the variabilities of fiber detection length, an additional 10 km and 5 km single-mode fiber (SMF) are inserted in the route.

The rumble strips installed on the pavement are in an indentation spacing of one every foot (30.5 cm) along the direction of travel of vehicle tires. Each strip exhibits a height of substantially 0.5 inches (1.27 cm). Such a strip is sufficient to produce vibration signals when a vehicle tire travels over it.

FIG. 2(B) shows illustrative collected SNAP signals in waterfall traces on a sunny and a rainy day. The signal strength and patterns of SNAP are different with weather-ground conditions (e.g., sunny/rainy day), sensing distance (e.g., hundreds or thousands of meters), vehicle type (e.g., sedan/truck) and soil type (e.g., grass/pavement).

Figure 3A:
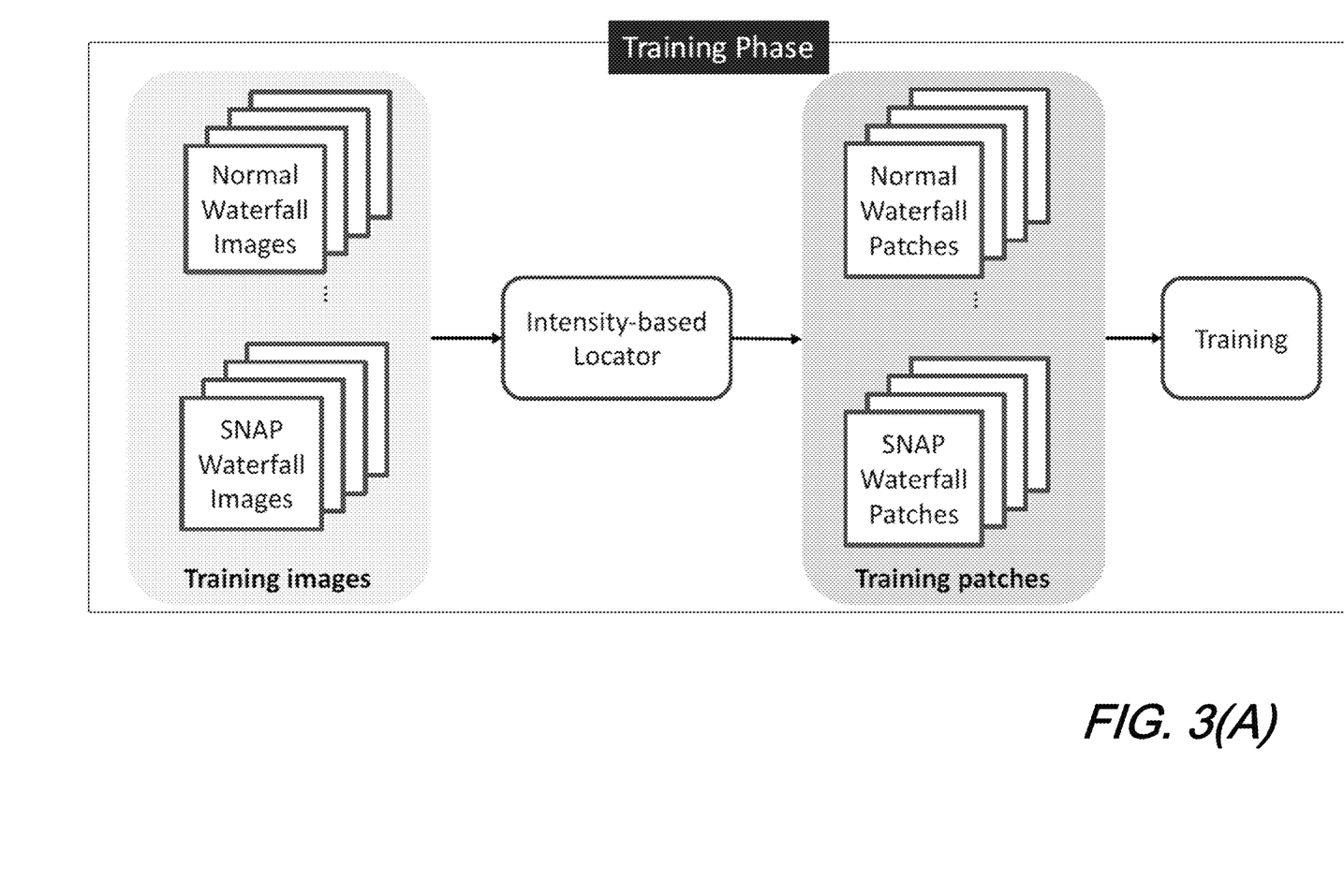
FIG. 3(A) and FIG. 3(B) are flow diagrams illustrating model training and inference procedures according to aspects of the present disclosure.
Figure 3B:
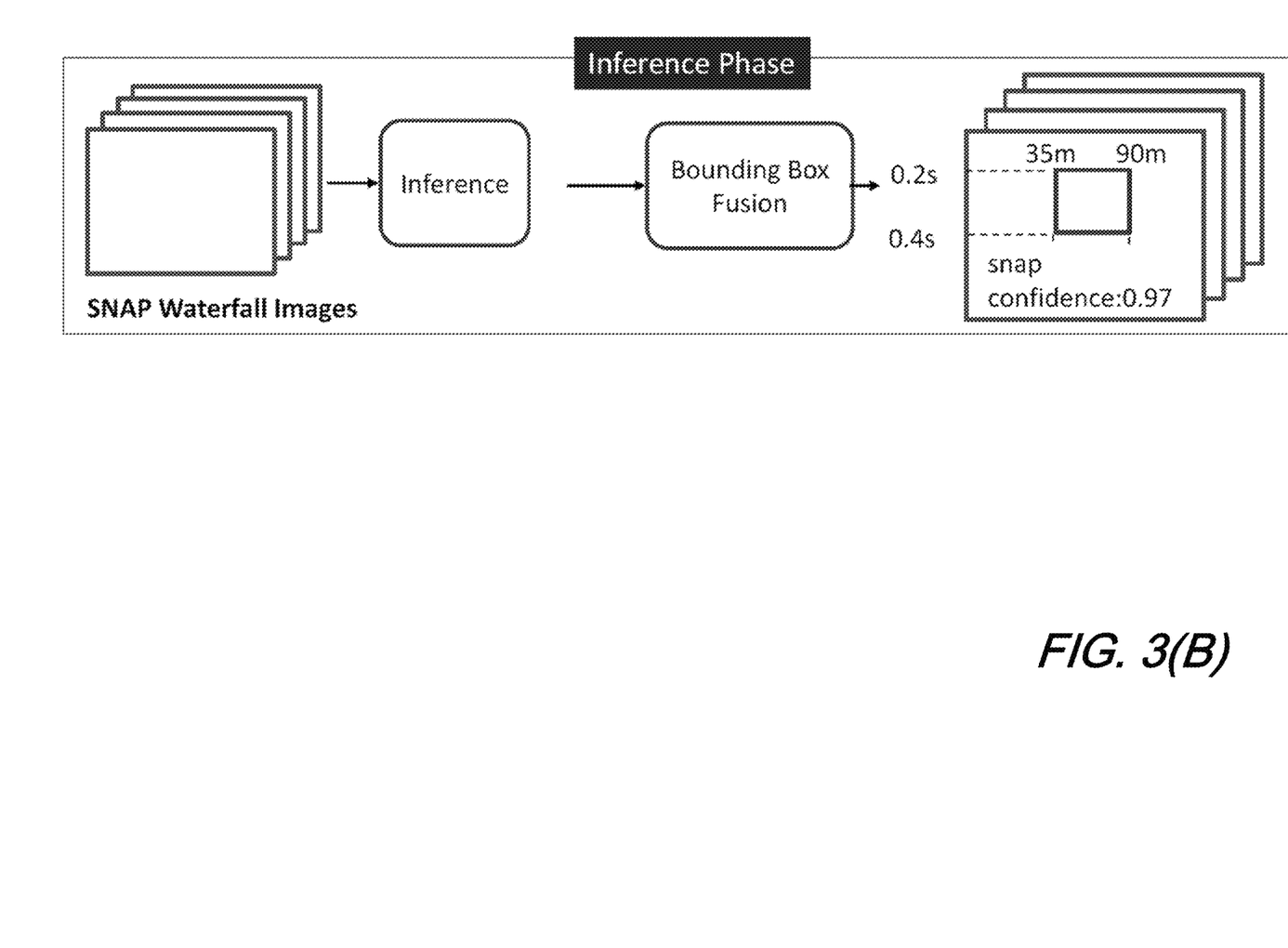

FIG. 3(A) and FIG. 3(B) are flow diagrams illustrating model training and inference procedures according to aspects of the present disclosure. As shown in the figure, during a training phase, a preprocessing step extracts regions of waterfall images exhibiting high vibration intensity, and a model is trained using data augmented from many waterfall patches labeled as SNAP or Background. During the inference phase, the input waterfall images are converted into individual rectangle patches by applying sliding windows with overlaps. The identified windows that contain SNAP events are then merged into one single box via a boxes-fusion step. The timestamp, cable location, event type, and confidence score are provided as the output Shown further in the figure it may be observed that our inventive two-stage model combines deep representation learning (RL) with support vector machine (SVM). The embedding network performs a verification task, which determines whether the vibration patterns in a pair of patches are caused by the same event (either normal traffic or SNAP). The SVM classifier performs an identification task which assigns a class label to each patch. A convolutional neural network architecture is well-suited for detecting patterns from two-dimensional waterfall data viewed as images.

Figure 4:
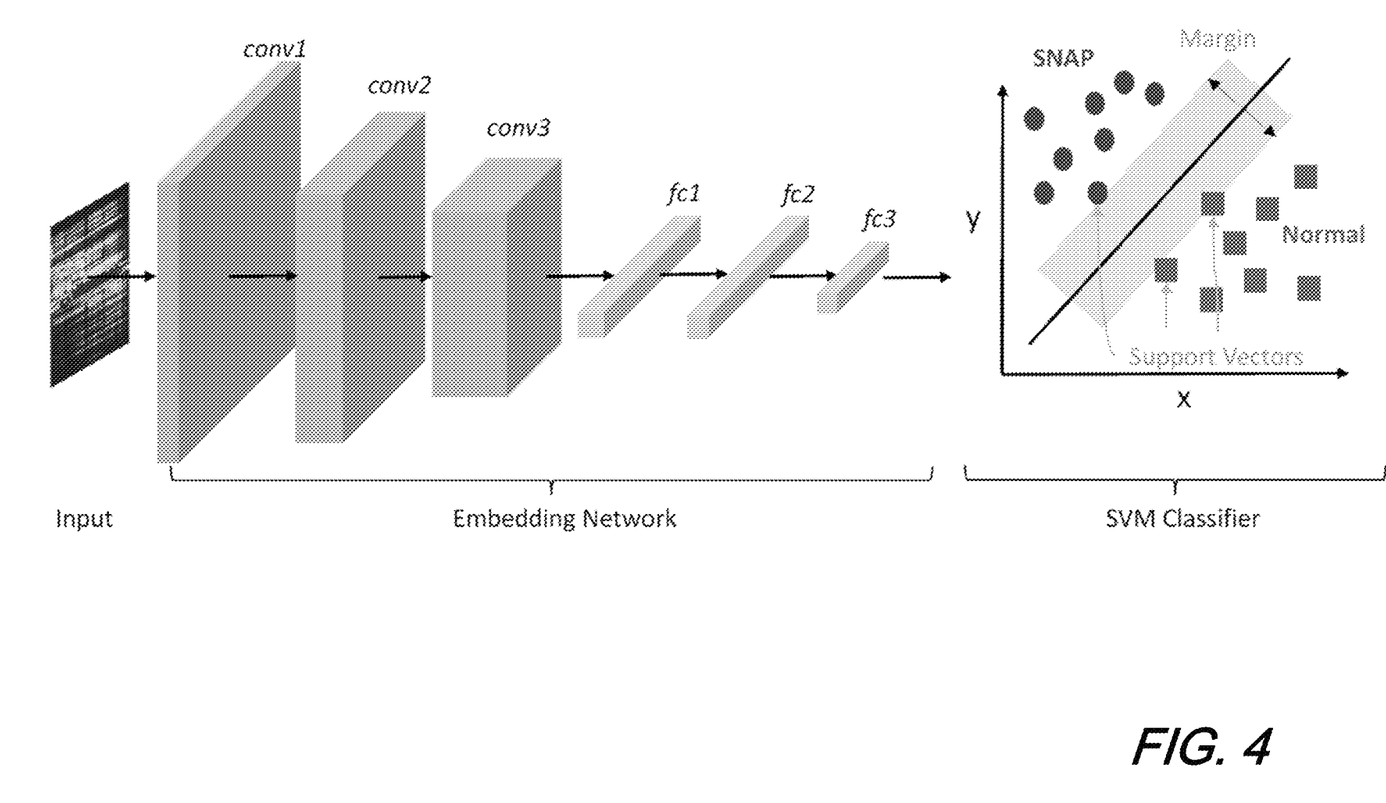
FIG. 4 is a schematic diagram showing an illustrative architecture of our model according to aspects of the present disclosure.

FIG. 4 is a schematic diagram showing an illustrative architecture of our model according to aspects of the present disclosure.

Our model can learn to achieve >91.8% average classification accuracy, consistently against various heterogeneous factors, such as sunny-rainy, 0-10-15 km, Grass-Pavement, Truck-Sedan-Minivan, single or two vehicles. Experimental results are summarized in Tables 1-4, each entry reports the mean+/−standard deviation out of 10 independent runs To perform SNAP event localization, we take a sliding window-based approach and apply the trained classifier to each image patch SNAP vibration may appear in multiple overlapping boxes.

Figure 5:
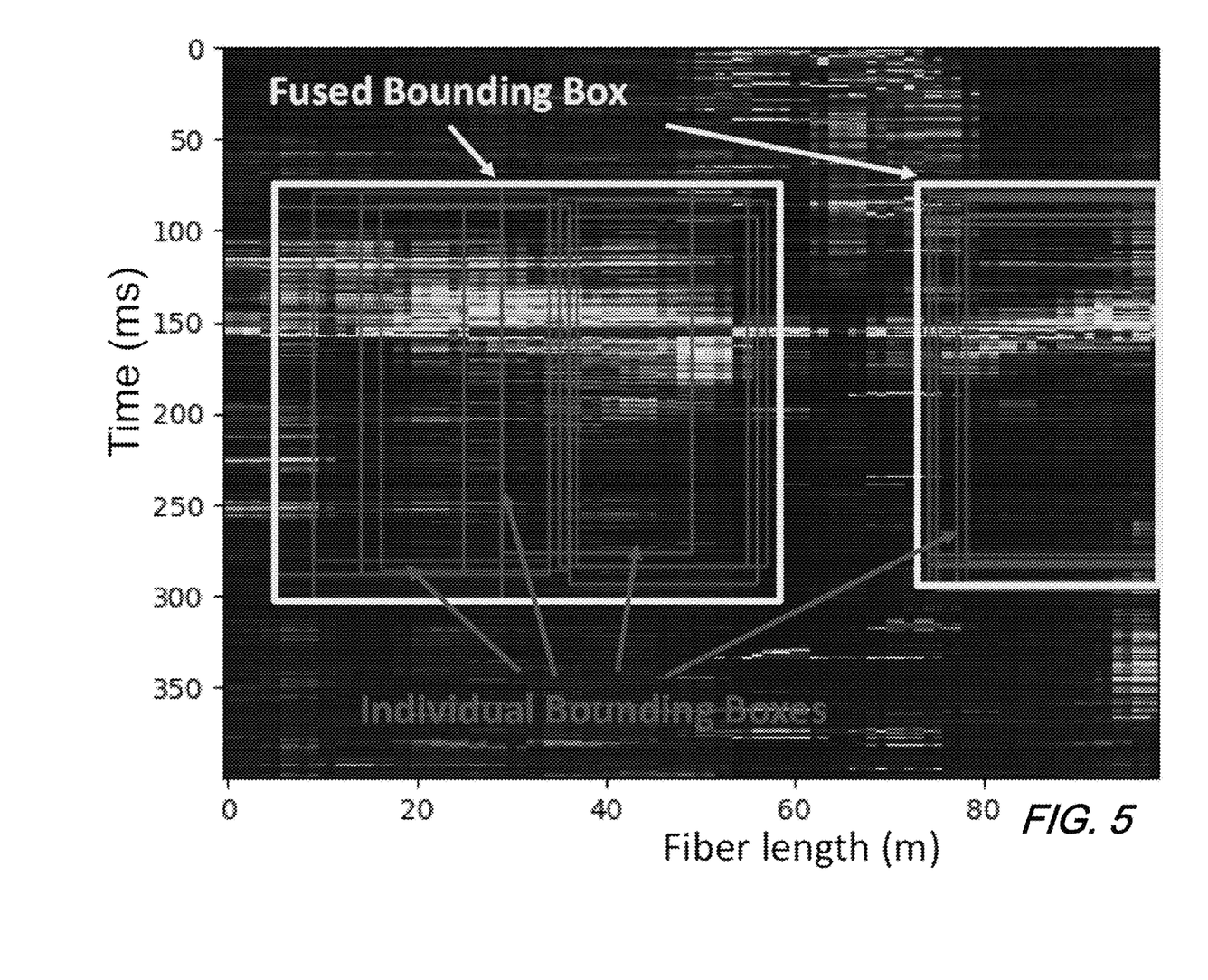
FIG. 5 is a schematic waterfall plot with SNAP events denoted therein according to aspects of the present disclosure.
Figure 6:
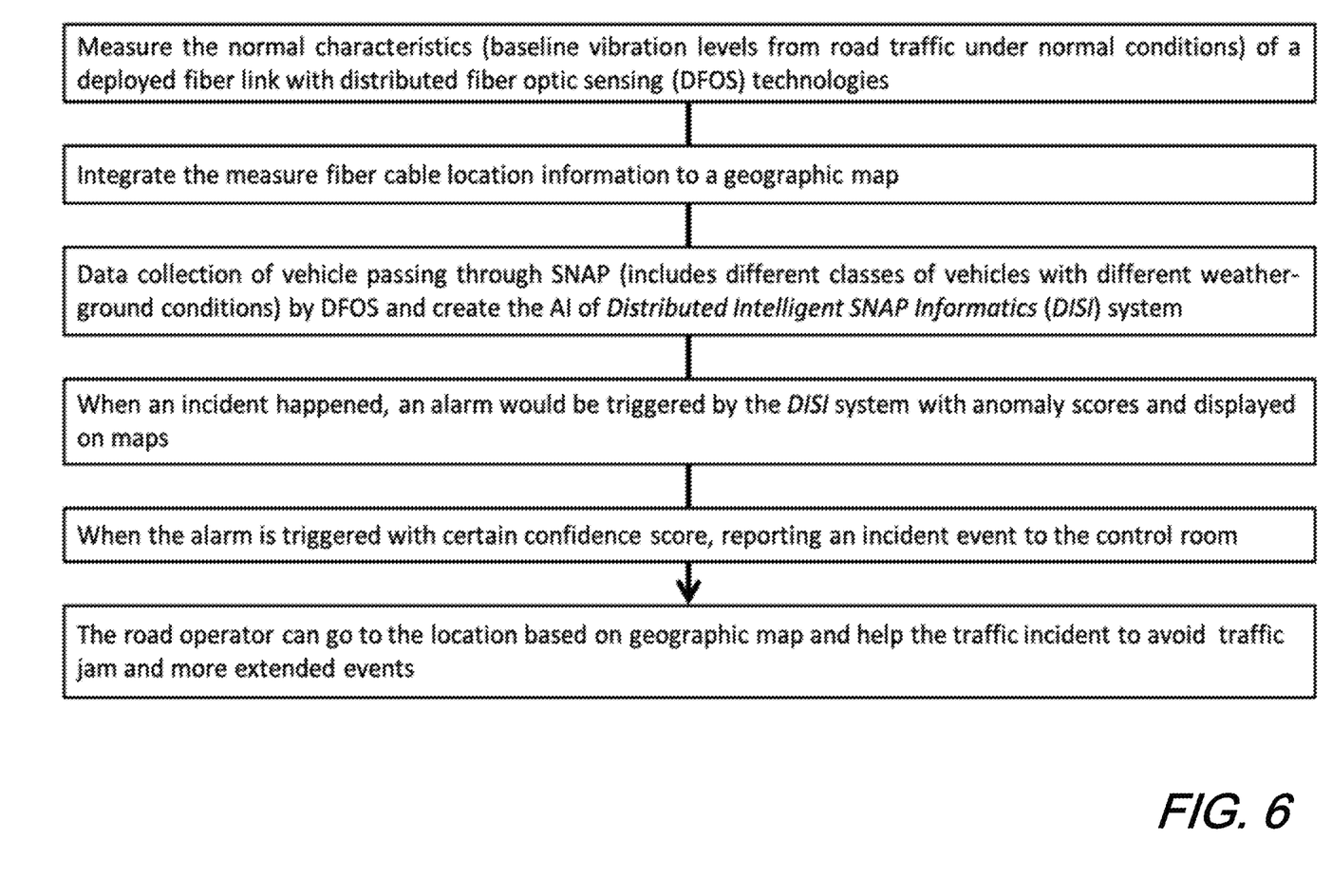
FIG. 6 is a flow diagram of an overall procedure according to aspects of the present disclosure.

FIG. 5 is a schematic waterfall plot with SNAP events denoted therein according to aspects of the present disclosure. As illustrated in FIG. 5, a single fused bounding box is derived from taking union of multiple individual bounding boxes. The timestamp and location of SNAP events within each fused bounding box is estimated via a peak-finding algorithm FIG. 6 is a flow diagram of an overall procedure according to aspects of the present disclosure. With reference to that figure, it may be observed that our inventive method involves first, measuring and/or determining a normal, baseline vibration level from road or other traffic or events and event characteristics using a fiber optic sensor cable of a deployed fiber link configured as a distributed fiber optic sensor (DFOS) system.

Second, the location(s) of the DFOS system fiber optic sensor cable is related to a geographic map.

Third, operating the DFOS system and collecting data of vehicles passing through SNAP and generating detectable vibration events, such data collection including different classes of vehicles with different weather-ground conditions) by DFOS and generating an AI model comprising the distributed intelligent SNAP informatics (DISI) system.

Fourth, when an incident is detected, an alarm is triggered by the DISI system using anomaly scores and outputting a map display of the anomaly location on map(s).

Fifth, when the alarm is triggered and it exhibits a pre-determined confidence score, the incident event is reported to a control room or supervisory system for further action.

Sixth, road maintenance crews or first responders may be dispatched to the location at which the incident occurred.

To evaluate our inventive systems, methods, and structures, we conducted a field trial using a setup substantially as that shown previously in FIG. 2(A). As shown and deployed, the fiber sensing system (with AI engines for real-time inference) is optically connected to the fiber optic sensor cable buried underground at a depth of approximately 15-20 inches. The fiber optic sensing system employed in this trial utilizes a Distributed Acoustic Sensing (DAS) methodology, which measures a change in Rayleigh scattering via interferometric phase beating in fiber. The DAS system employed uses short optical pulses along with on-chip fast processing to enable an equivalent spatial resolution as small as 1 meter at 2000-Hz sampling rate. The rumbling stripes were installed on the pavement with a spacing of substantially 7 inches (17.8 cm) every foot (30.5 cm) along the travelling direction of test vehicles and exhibited a height of 0.5 inches (1.27 cm). Such configuration will create a sufficient height/depth for a tire drop when the tire overrides the strip sufficient to produce detectable vibration signals.

To sufficiently emulate practical challenges of SNAP detection, a number of heterogeneous factors are considered in our field trial experimental design. These include (1) ground type—fiber buried under grass ("G") or embedded within asphalt pavement ("P"), (2) weather conditions—sunny day (dry ground) and rainy day (wet ground), (3) vehicle types—sedan, minivan, and truck, and (4) sensing distance—300 m, 10.4 km and 15.8 km.

In our trial configuration an additional 10 km and 5 km of single-mode fibers (SMF) are inserted in the fiber route. As a result, every SNAP event is sensed simultaneously by 6 different segments of fiber in one driving test. Similar to that shown in FIG. 3(A), exemplary SNAP signals in the spatial-time domain, collected from a sedan on a sunny day and a truck on a rainy day, at 3 different sensing distances under 2 ground types ("G" and "P"). The recorded sensing data exhibit distinct signal and noise characteristics, highlighting the difficulties in feature engineering using signal processing techniques.

As previously discussed, we consider the spatiotemporal locality of sensing signals, and employ a sliding-window paradigm for SNAP event detection—independently classify image patches as being labeled as SNAP or Others. The classification is performed in the embedding space.

In particular, the data representation is optimized by triplet loss, such that patch embeddings with the same label are closer to each other than those with different labels. As noted, the embedding function is trained using convolutional neural network (CNN) on a verification task, which determines whether the vibration patterns in a pair of patches are caused by the same kind of events or not. Based on the learned representation, the support vector machine (SVM) classifier performs an identification task, which assigns the class label to the patch embedding.

Our overall training and inference architecture is like that shown previously. To improve training performance, data augmentation is performed by randomly sampling patches around regions with high vibrations, promoting contrast between SNAP vibration and other strong vibrations such as normal driving in a learning process. In the inference stage, the input waterfall images are converted into local patches with overlaps by sliding window. Neighboring windows with SNAP events detected are then merged into one single bounding box. The AI engine takes continuous streams of input data and runs inference in real-time on GPU, providing a timestamp, cable location, event type, and confidence score as output.

In performing our field trial experiments, we collected data from multiple independent rounds (20 or 25 for sunny/rainy day), in each of the 12 controlled experiments covering 2 weather conditions, 3 vehicle types, and 2 event types (crossing SNAP or passing by). In each round, we obtained data directly at 3 sensing distances under 2 ground types. To train a SNAP event detector that works under different practical scenarios, we aggregated all the training data collected under all 36 conditions. Testing was performed under each unique condition, such that the effects of individual factors can be isolated. To ensure there is no overlap between training and test set, a split ratio of 8:2 was applied on the rounds. The performance was measured by three classification metrics: 1) Accuracy; 2) Area Under the ROC Curve (AUC); and 3) Area Under Precision-Recall Curve (AUPRC). Advantageously, our model achieved high average classification accuracy, consistently against various heterogeneous factors. As would be expected however, we determined that that longer sensing distance, higher damping coefficient under grass, and lighter vehicle weight can slightly reduce the model performance, while weather condition had no obvious effects.

TABLE 1

Classification Performance (Accuracy, AUC, AUPRC) with different factors on a sunny day.

|  | Test Accuracy (%) | Test AUC (%) | Test AUPRC (%) |
| --- | --- | --- | --- |
| 0 km | 98.5 ± 1.1 | 98.9 ± 0.9 | 98.1 ± 2.1 |
| 10 km | 98.4 ± 1.0 | 98.9 ± 0.7 | 97.7 ± 1.8 |
| 15 km | 93.7 ± 3.9 | 95.3 ± 3.4 | 91.8 ± 5.4 |
| Grass | 96.4 ± 2.1 | 97.5 ± 1.4 | 94.9 ± 2.8 |
| Pavement | 97.3 ± 2.2 | 97.8 ± 2.2 | 95.7 ± 4.3 |
| Truck | 96 ± 2.1 | 97.1 ± 2.0 | 95.9 ± 3.3 |
| Sedan | 96.6 ± 2.7 | 97.0 ± 2.5 | 96.3 ± 5.3 |
| Minivan | 97.9 ± 1.4 | 98.6 ± 1.3 | 96.4 ± 2.8 |
| Total | 96.9 ± 1.8 | 97.7 ± 1.5 | 95.3 ± 3.1 |

TABLE 2

Classification Performance (Accuracy, AUC, AUPRC) with different factors on a rainy day.

|  | Test Accuracy (%) | Test AUC (%) | Test AUPRC (%) |
| --- | --- | --- | --- |
| 0 km | 95.9 ± 2.1 | 97.5 ± 1.9 | 95.7 ± 4.9 |
| 10 km | 97.5 ± 1.0 | 98.8 ± 0.6 | 97.7 ± 1.7 |
| 15 km | 95.0 ± 2.9 | 97.1 ± 1.3 | 93.5 ± 4.1 |
| Grass | 94.6 ± 1.9 | 96.9 ± 1.4 | 94.6 ± 3.6 |
| Pavement | 97.7 ± 2.2 | 98.7 ± 1.1 | 94.4 ± 3.8 |
| Truck | 95 ± 2.3 | 97.7 ± 1.0 | 96.4 ± 2.5 |
| Sedan | 94.7 ± 5.2 | 96.6 ± 2.8 | 91.6 ± 7.2 |
| Minivan | 98.0 ± 1.5 | 98.7 ± 1.1 | 97.0 ± 2.4 |
| Total | 96.4 ± 1.5 | 98.2 ± 0.9 | 96.4 ± 2.4 |

TABLE 3

Comparison of test accuracy (%) to different factors between sunny and rainy day.

|  | Sunny | Rainy |
| --- | --- | --- |
| 0 km | 98.5 ± 1.1 | 95.9 ± 2.1 |
| 10 km | 98.4 ± 1.0 | 97.5 ± 1.0 |
| 15 km | 93.7 ± 3.9 | 95.0 ± 2.9 |
| Grass | 96.4 ± 2.1 | 94.6 ± 1.9 |
| Pavement | 97.3 ± 2.2 | 97.7 ± 2.2 |
| Truck | 96 ± 2.1 | 95.6 ± 2.3 |
| Sedan | 96.6 ± 2.7 | 94.7 ± 5.2 |
| Minivan | 97.9 ± 1.4 | 98.0 ± 1.5 |
| Total | 96.9 ± 1.8 | 96.4 ± 1.5 |

TABLE 4

Comparison of test accuracy (%) to different factors between single vehicle and two vehicles on a rainy day.

|  | Single Car | Two Cars |
| --- | --- | --- |
| 0 km | 98.5 ± 1.1 | 95.9 ± 2.1 |
| 10 km | 98.4 ± 1.0 | 97.5 ± 1.0 |
| 15 km | 93.7 ± 3.9 | 95.0 ± 2.9 |
| Grass | 96.4 ± 2.1 | 94.6 ± 1.9 |
| Pavement | 97.3 ± 2.2 | 97.7 ± 2.2 |
| Truck | 96 ± 2.1 | 95.6 ± 2.3 |
| Sedan | 96.6 ± 2.7 | 94.7 ± 5.2 |
| Minivan | 97.9 ± 1.4 | 98.0 ± 1.5 |
| L: Sedan, R: Minivan | — | 95.3 ± 2.2 |
| L: Minivan R: Sedan | — | 97.4 ± 3.0 |
| Total | 96.9 ± 1.8 | 96.4 ± 1.5 |

At this point, while we have presented this disclosure using some specific examples, those skilled in the art will recognize that our teachings are not so limited. Accordingly, this disclosure should be only limited by the scope of the claims attached hereto.

The invention claimed is:
1. A method of operating a distributed fiber optic sensing (DFOS) system employing distributed intelligent sonic alert pattern (SNAP) informatics, the method comprising:
operating the DFOS system by
generating by an interrogator, interrogating light and sending it into a length of optical sensing fiber located proximate to a roadway;
detecting backscattered light that results from the interrogating light sent into the optical sensing fiber;
generating and outputting signals indicative of detected backscattered light; and
analyzing, the outputted signals indicative of detected backscattered light and determining strain signals associated with location(s) along the length of the optical sensing fiber that are indicative of a vibration and acoustic environment of the optical sensing fiber at the location(s); and
determining normal, baseline characteristics including baseline vibration levels from road traffic operating on the roadway under normal conditions of the optical sensing; and
determining when a vehicle operating on the roadway passes through a SNAP area of the roadway;
wherein a portion of the optical sensing fiber is located under grass and another portion of the optical sensing fiber is located under a portion of the roadway;

wherein said DFOS system analyzing is performed by a two-stage model comprising an embedding network providing deep representation learning and a support vector machine classifier;

wherein the embedding network comprises a convolutional neural network and detects patterns from two-dimensional waterfall images generated from the determined strain signals and locations.

2. The method of claim 1 wherein the convolutional neural network is trained on a set of training images including both normal waterfall images indicative of normal traffic patterns and SNAP waterfall images indicative of traffic encountering SNAP areas of the roadway.

3. The method of claim 2 wherein the training images are preprocessed to extract regions exhibiting a high vibration intensity relative to other regions.

4. The method of claim 3 wherein the training of the convolutional neural network includes training waterfall images of different weather conditions, vehicle types, and overlying ground types.

5. The method of claim 4 wherein the DFOS system generates an alarm when a detected SNAP event exceeds a predetermined vibrational threshold.

6. The method of claim 5 wherein the DFOS system triggers a notification event when the alarm exhibits a predetermined confidence score.

7. The method of claim 1 wherein the optical sensing fiber simultaneously carries telecommunications traffic.

\* \* \* \* \*